(12) United States Patent
Ueda

(10) Patent No.: US 10,857,840 B2
(45) Date of Patent: Dec. 8, 2020

(54) PNEUMATIC TIRE

(71) Applicant: TOYO TIRE & RUBBER CO., LTD., Osaka (JP)

(72) Inventor: Yukiko Ueda, Osaka (JP)

(73) Assignee: TOYO TIRE CORPORATION, Itami (JP)

( * ) Notice: Subject to any disclaimer, the term of this patent is extended or adjusted under 35 U.S.C. 154(b) by 651 days.

(21) Appl. No.: 15/498,081

(22) Filed: Apr. 26, 2017

(65) Prior Publication Data
US 2018/0065423 A1 Mar. 8, 2018

(30) Foreign Application Priority Data

Sep. 7, 2016 (JP) ................................ 2016-174671
Sep. 7, 2016 (JP) ................................ 2016-174701

(51) Int. Cl.
*B60C 11/01* (2006.01)
*B60C 13/02* (2006.01)

(52) U.S. Cl.
CPC .............. *B60C 13/02* (2013.01); *B60C 11/01* (2013.01); *B60C 2011/013* (2013.01)

(58) Field of Classification Search
CPC .... B60C 11/01; B60C 13/02; B60C 2011/013
See application file for complete search history.

(56) References Cited

U.S. PATENT DOCUMENTS

| | | | | |
|---|---|---|---|---|
| 2,972,368 A * | 2/1961 | Williams | ............ | B60C 11/0311 |
| | | | | 152/209.16 |
| 6,533,007 B1 * | 3/2003 | McMannis | .............. | B60C 11/01 |
| | | | | 152/209.16 |
| 2009/0194212 A1 | 8/2009 | Bonko et al. | | |
| 2010/0288409 A1 | 11/2010 | Ohara | | |
| 2016/0101582 A1 * | 4/2016 | Ikonomov | ............... | B60C 11/02 |
| | | | | 156/96 |
| 2018/0065415 A1 * | 3/2018 | Sakamoto | ............... | B60C 11/01 |
| 2018/0065418 A1 * | 3/2018 | Sakamoto | ............... | B60C 11/01 |
| 2018/0065420 A1 * | 3/2018 | Kuwano | ................. | B60C 11/01 |
| 2018/0065421 A1 * | 3/2018 | Kuwano | ................. | B60C 13/02 |
| 2018/0065422 A1 * | 3/2018 | Kuwano | ................. | B60C 13/02 |

FOREIGN PATENT DOCUMENTS

| | | | |
|---|---|---|---|
| JP | 11-151909 A | * | 6/1999 |
| JP | 2010-264962 A | | 11/2010 |

OTHER PUBLICATIONS

Machine translation for Japan 11-151909 (Year: 2019).*
Office Action dated Aug. 6, 2020, issued in counterpart JP Application No. 2016-174671, with English translation (9 pages).

* cited by examiner

*Primary Examiner* — Steven D Maki
(74) *Attorney, Agent, or Firm* — Westerman, Hattori, Daniels & Adrian, LLP

(57) ABSTRACT

In a pneumatic tire, at least one of plurality of projecting portions includes at least one opening. At least one of the projecting portions is divided into an inner region placed on the inner side in a tire radial-direction and an outer region placed on the outer side in the tire radial-direction with respect to a position of an outer end of a belt play in a tire width-direction, the belt play placed on the innermost side in the tire radial-direction. A depth of the opening in the inner region is different from a depth of the opening in the outer region.

19 Claims, 15 Drawing Sheets

PNEUMATIC TIRE

CROSS REFERENCE TO RELATED APPLICATIONS

This application claims the benefit of priority of Japanese application no. 2016-174671, filed on Sep. 7, 2016, and Japanese application no. 2016-174701, filed on Sep. 7, 2016, which are incorporated herein by reference.

BACKGROUND OF THE INVENTION

Field of the Invention

The present invention relates to a pneumatic tire having a plurality of projecting portions which project in a tire width-direction.

Description of the Related Art

There are conventionally known pneumatic tires each having a plurality of projecting portions which project in a tire width-direction (e.g., JP-A-2010-264962). According to a structure of this pneumatic tire, traction performance on a mud area or a rocky area is enhanced due to resistance caused when the projecting portions shear dirt and due to friction between the projecting portions and rock, and resistance to external damage is enhanced due to increase in rubber thickness.

By the way, weight balance of the tire is prone to become uneven due to existence of the projecting portions. Accordingly, when the tire is produced (vulcanized), rubber does not smoothly flow, the tire may be chipped (bare may be generated) with respect to a desired tire shape, or uniformity may be lowered and this may cause vibration or noise of a vehicle.

SUMMARY OF INVENTION

It is an object of the present invention to provide a pneumatic tire capable of suppressing unevenness of weight balance.

There is provided a pneumatic tire, which includes:

a sidewall portion extending in a tire radial-direction; and a tread portion having a tread surface on an outer side in the tire radial-direction and connected to an outer end of the sidewall portion in the tire radial-direction, wherein the tread portion includes a tread rubber placed on the outer side in the tire radial-direction, and at least one belt ply placed on an inner side of the tread rubber in the tire radial-direction, the tread rubber includes a plurality of grooves extending to an outer end in a tire width-direction, and a plurality of blocks arranged in a tire circumferential-direction by being defined by the plurality of grooves, the sidewall portion includes a plurality of projecting portions projecting in the tire width-direction, the projecting portions are placed such that at least portions of the projecting portions are superposed on one of the plurality of blocks in the tire radial-direction as viewed from the tire width-direction, at least one of the plurality of projecting portions includes at least one opening, at least one of the projecting portions is divided into an inner region placed on the inner side in the tire radial-direction and an outer region placed on the outer side in the tire radial-direction with respect to a position of an outer end of the belt play in the tire width-direction, wherein the belt play placed on the innermost side in the tire radial-direction, and a depth of the opening in the inner region is different from a depth of the opening in the outer region.

Also, the pneumatic tire may have a configuration in which:

the depth of the opening in the inner region is greater than that of the opening in the outer region.

Also, the pneumatic tire may have a configuration in which:

in a ratio of the total sums of the opening areas of the opening with respect to an actual area of the projecting portion, the ratio of the inner region is greater than the ratio of the outer region.

Also, the pneumatic tire may have a configuration in which:

a projecting amount of the projecting portion in the inner region is greater than a projecting amount of the projecting portion in the outer region.

Also, the pneumatic tire may have a configuration in which:

at least one of the projecting portions includes a convex portion accommodated in the opening placed in the inner region, and the convex portion extends along the tire circumferential-direction.

Also, the pneumatic tire may have a configuration in which:

a projecting amount of the convex portion is equal to more than ½ of the depth of the opening.

Also, the pneumatic tire may have a configuration in which:

the depth of the opening in the outer region is greater than that of the opening in the inner region.

Also, the pneumatic tire may have a configuration in which:

in a ratio of the total sums of the opening areas of the opening with respect to an actual area of the projecting portion, the ratio of the outer region is greater than the ratio of the inner region.

Also, the pneumatic tire may have a configuration in which:

a projecting amount of the projecting portion in the outer region is greater than a projecting amount of the projecting portion in the inner region.

Also, the pneumatic tire may have a configuration in which:

at least one of the projecting portions includes a convex portion accommodated in the opening placed in the outer region, and the convex portion extends along the tire radial-direction.

Also, the pneumatic tire may have a configuration in which:

a projecting amount of the convex portion is equal to more than ½ of the depth of the opening.

Also, there is provided a pneumatic tire, which includes:

a sidewall portion extending in a tire radial-direction; and a tread portion having a tread surface on an outer side in the tire radial-direction and connected to an outer end of the sidewall portion in the tire radial-direction, wherein the tread portion includes a tread rubber placed on the outer side in the tire radial-direction, and at least one belt ply placed on an inner side of the tread rubber in the tire radial-direction, the tread rubber includes a plurality of grooves extending to an outer end in a tire width-direction, and a plurality of blocks arranged in a tire circumferential-direction by being defined by the plurality of grooves, the sidewall portion includes a plurality of projecting portions projecting in the tire width-direction, the projecting portions are placed such that at least portions of the projecting portions are superposed on one of the plurality of blocks in the tire radial-direction as viewed from the tire width-direction, at least one of the plurality of projecting portions includes at least one opening, at least one of the projecting portions is divided into an inner region placed on the inner side in the tire radial-direction and an outer region placed on the outer side in the tire radial-direction with respect to a position of an outer end of the belt play in the tire width-direction, wherein the belt play placed on the innermost side in the tire radial-direction, and a depth of the opening in the inner region is equal to or greater than a depth of the opening in the outer region.

Also, there is provided a pneumatic tire, which includes:

a sidewall portion extending in a tire radial-direction; and a tread portion having a tread surface on an outer side in the tire radial-direction and connected to an outer end of the sidewall portion in the tire radial-direction, wherein the tread portion includes a tread rubber placed on the outer side in the tire radial-direction, and at least one belt ply placed on an inner side of the tread rubber in the tire radial-direction, the tread rubber includes a plurality of grooves extending to an outer end in a tire width-direction, and a plurality of blocks arranged in a tire circumferential-direction by being defined by the plurality of grooves, the sidewall portion includes a plurality of projecting portions projecting in the tire width-direction, the projecting portions are placed such that at least portions of the projecting portions are superposed on one of the plurality of blocks in the tire radial-direction as viewed from the tire width-direction, at least one of the plurality of projecting portions includes at least one opening, at least one of the projecting portions is divided into an inner region placed on the inner side in the tire radial-direction and an outer region placed on the outer side in the tire radial-direction with respect to a position of an outer end of the belt play in the tire width-direction, wherein the belt play placed on the innermost side in the tire radial-direction, and a depth of the opening in the outer region is equal to or greater than a depth of the opening in the inner region.

DETAILED DESCRIPTION OF THE PREFERRED EMBODIMENTS

First Embodiment

A pneumatic tire of a first embodiment will be described below with reference to FIGS. 1 to 11. Size ratios in each of the drawings (including FIGS. 12 to 21) do not always match with actual size ratios, and size ratios between the drawings do not always math with each other.

Figure 1:
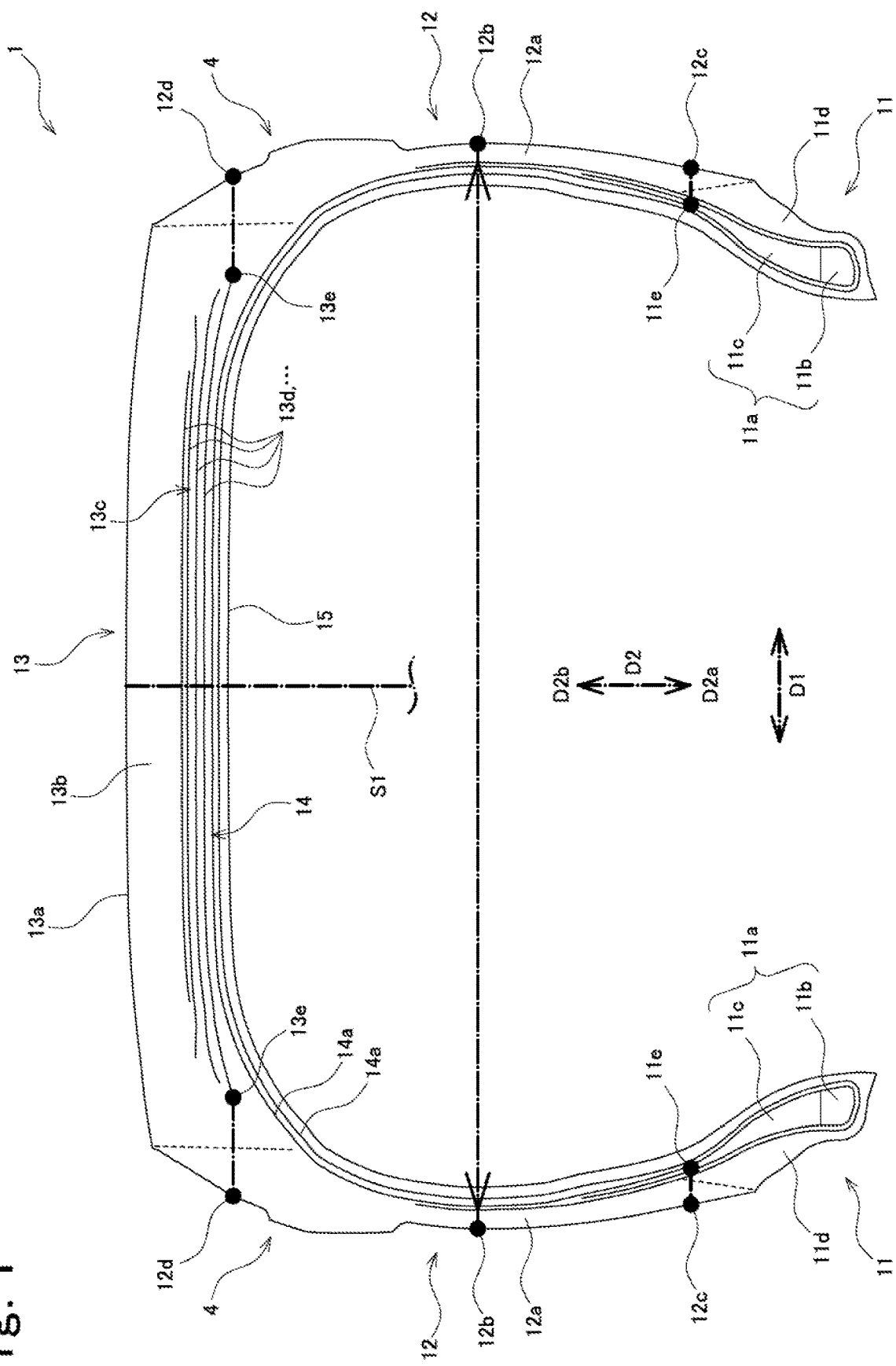
FIG. 1 is a sectional view of essential portions of a tire meridional plane of a pneumatic tire of an embodiment.

As shown in FIG. 1, the pneumatic tire (also called "tire" simply) 1 includes a pair of bead portions 11 having beads 11a. The tire 1 includes sidewall portions 12 extending from the bead portions 11 radially outward in a tire radial-direction D2, and a tread portion 13 which is connected to outer ends of the pair of sidewall portions 12 in the tire-radial direction D2. The tread portion 13 is provided with a tread surface 13a which comes into contact with ground. The tread surface 13a is located on the outer side of in a tire radial-direction D2. The tire 1 is mounted on a rim (not shown).

The tire 1 includes a carcass layer 14 extending between the pair of beads 11a and 11a, and an inner linear 15 located on an inner side of the carcass layer 14 and facing an inner space of the tire 1 into which air is charged. The carcass layer 14 and the inner linear 15 are placed along an inner periphery of the tire over the bead portions 11, the sidewall portions 12 and the tread portion 13.

In FIG. 1 (also in the other drawings), a first direction D1 is a tire width-direction D1 which is parallel to the tire rotation axis, a second direction D2 is the tire radial-direction D2 which is a diameter direction of the tire 1, and a third direction D3 (see FIGS. 2 and 3, for example) is a tire circumferential-direction D3 which is a direction around a tire axial-direction. One direction D2a of the second direction D2 is directed inner side of the tire radial-direction D2, and the other direction D2b is directed outer side of the tire radial-direction D2. A tire equator surface S1 is a surface intersecting with the tire rotation axis at right angle, and is located on a center of the tire width-direction D1, and a tire meridional surface is a surface including a surface including the tire rotation axis, and intersecting with the tire equator surface S1.

Each of the beads 11a includes an annularly formed bead core 11b, and a bead filler 11c placed on an outer side of the bead core 11b in the tire radial-direction D2. For example, the bead core 11b is formed by laminating rubber-coated bead wires (metal wires, for example), and the bead filler 11c is formed by forming hard rubber outward of the tire radial-direction D2 in a tapered manner.

Each of the bead portions 11 includes a rim strip rubber 11d placed on an outer side in the tire width-direction D1 than the carcass layer 14 to configure an outer surface which comes into contact with the rim. Each of the sidewall portions 12 includes a sidewall rubber 12a which is placed on an outer side in the tire width-direction D1 than the carcass layer 14 to configure an outer surface.

The tread portion 13 includes a tread rubber 13b. An outer surface of the tread rubber 13b configures the tread surface 13a. The tread portion 13 also includes a belt portion 13c placed between the tread rubber 13b and the carcass layer 14. The belt portion 13c includes a plurality of (four in FIG. 1) belt plies 13d. For example, each of the belt plies 13d includes a plurality of belt cords (organic fiber or metal, for example) which are arranged in parallel, and topping rubbers for coating the belt cords.

The carcass layer 14 is composed of at least one (two in FIG. 1) carcass plies 14a. Each of the carcass plies 14a is folded back around the bead 11a to surround the bead 11a. Each of the carcass plies 14a includes a plurality of ply cords (organic fiber or metal, for example) which are arranged in a direction intersecting with the tire circumferential-direction D3 substantially at right angles, and topping rubbers for coating the ply cords.

To maintain the air pressure, the inner linear 15 has an excellent function to prevent gas from passing through the inner linear 15. In the sidewall portion 12, the inner linear 15 is in intimate contact with an inner periphery of the carcass layer 14, and no other material is interposed between the inner linear 15 and the carcass layer 14.

For example, in a distance between the carcass ply 14a which is placed on the innermost side and a tire inner peripheral surface (inner peripheral surface of inner linear 15), the distance of the sidewall portion 12 is 90% to 180% of the distance of the tread portion 13. More specifically, the distance of the sidewall portion 12 is 120% to 160% of the distance of the tread portion 13.

An outer surface of the sidewall portion 12 has a position 12b which becomes the same, in the tire radial-direction D2, as the tire maximum position (more specifically, maximum distance position of distance of carcass layer 14 between outer sides in tire width-direction D1). The position 12b is called a tire maximum width position 12b, hereinafter.

The outer surface of the sidewall portions 12 has a position 12c which becomes the same, in the tire radial-direction D2, as an outer end 11e of the bead filler 11c in the tire radial-direction D2. The position 12c is called a bead filler outer end position 12c, hereinafter.

The outer surface of the sidewall portions 12 has a position 12d which becomes the same, in the tire radial-direction D2, as an outer end 13e in the tire width-direction D1 in one of the plurality of belt plies 13d which is placed on the innermost side in the tire radial-direction D2. This position 12d is called a belt end position 12d, hereinafter.

Figure 2:
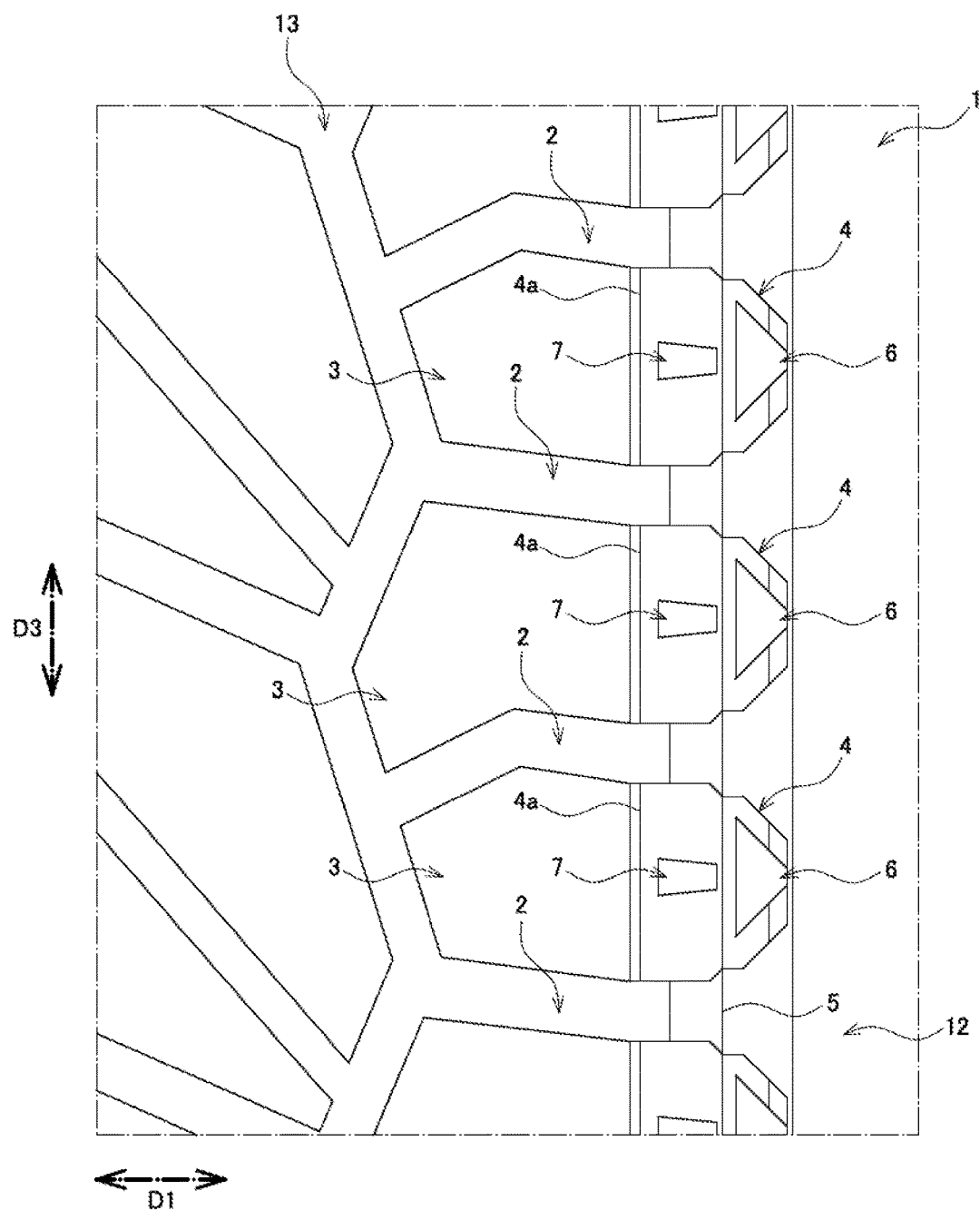
FIG. 2 is a front view (as viewed from tire radial-direction) of the pneumatic tire of the embodiment.
Figure 3:
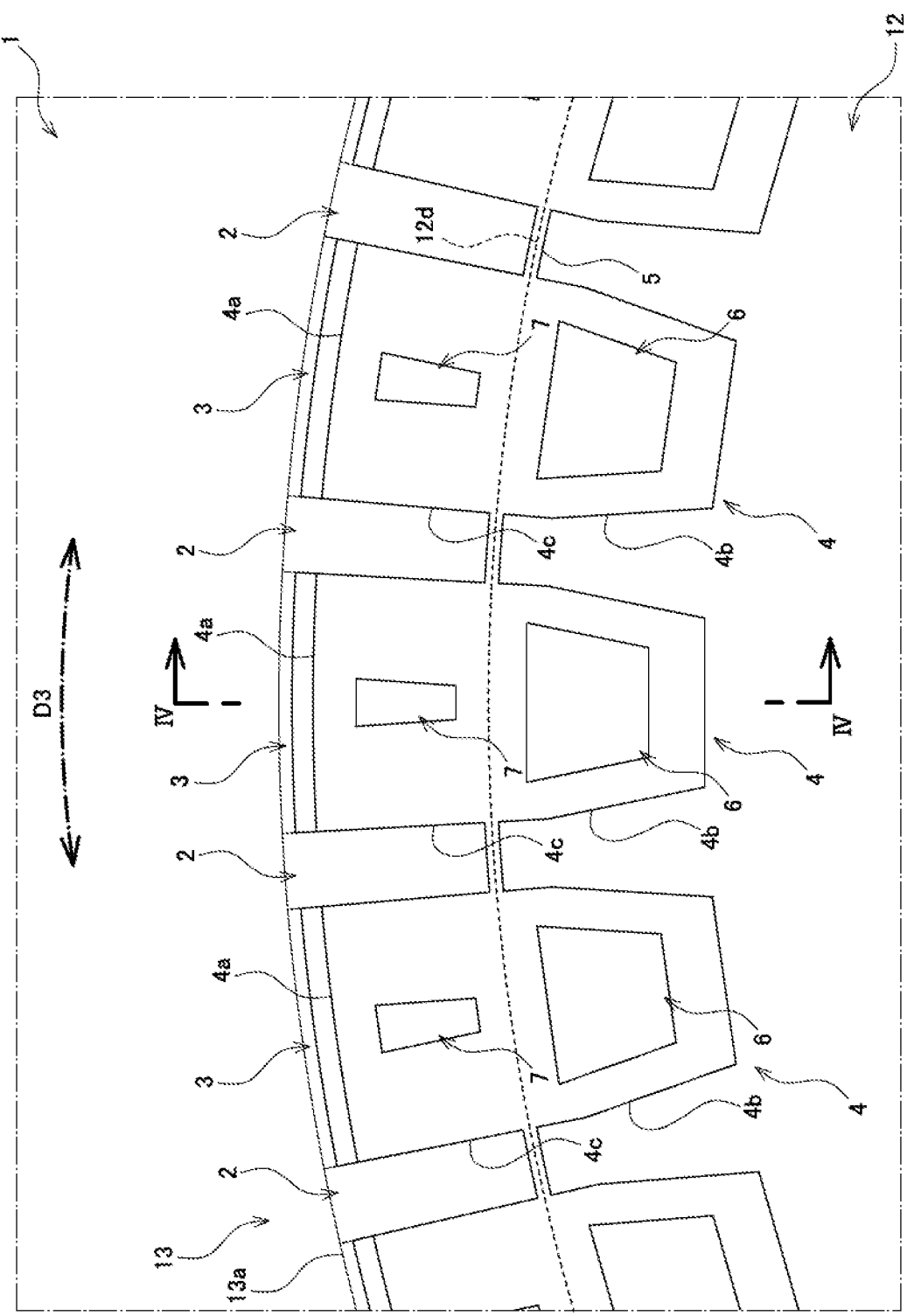
FIG. 3 is a side view (as viewed from tire width-direction) of the pneumatic tire of the embodiment.
Figure 4:
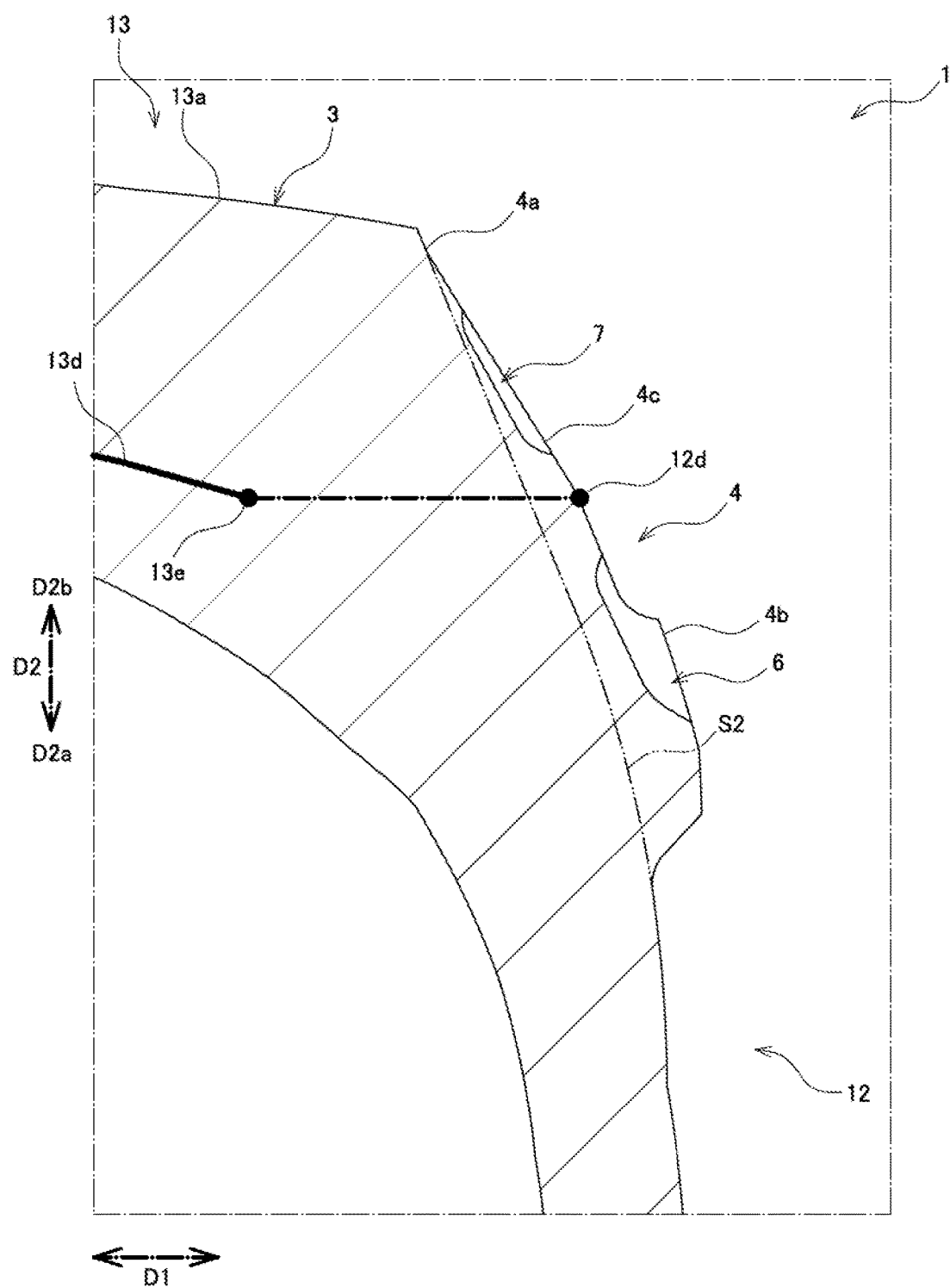
FIG. 4 is an enlarged sectional view of essential portions taken along line IV-IV of FIG. 3.

As shown in FIGS. 2 to 4, the tread portion 13 includes a plurality of grooves 2 extending to the outer end of the tread portion 13 in the tire width-direction D1, and a plurality of blocks 3 which are defined by the plurality of grooves 2, thereby being arranged in the tire circumferential-direction D3. Each of the sidewall portions 12 includes a plurality of projecting portions 4 projecting from a profile surface (reference surface) S2 in the tire width-direction D1, and an annular protrusion portion 5 projecting from the profile surface S2 in the tire width-direction D1, and extending along the tire circumferential-direction D3.

The projecting portions 4 are placed at least on the outer side in the tire radial-direction D2 of the sidewall portions 12. According to this, the projecting portions 4 can come into contact with mud and sand in a state where the tire 1 sinks due to a weight of the vehicle in a mud area and a sand area, or can come into contact with the uneven rocks in a rocky area. That is, the projecting portions 4 come into contact with the ground in bad roads such as a mud area, a sand area and a rocky area. The projecting portions 4 do not normally come into contact with the ground in a flat road.

The projecting portions 4 are located on an outer side in the tire radial-direction D2 than a bead filler outer end position 12c (see FIG. 1) of the sidewall portion 12. More specifically, the projecting portions 4 are placed on the outer side in the tire radial-direction D2 than a tire maximum width position 12b (see FIG. 1) of the sidewall portion 12.

The projecting portions 4 are placed such that at least portions of them are superposed at least one of the plurality of blocks 3 in the tire radial-direction D2 as viewed from the tire width-direction D1. That is, the projecting portions 4 are superposed on only one of the blocks 3 in the tire radial-direction D2 as viewed from the tire width-direction D1. For example, the projecting portion 4 is superposed on the block 3 in the tire radial-direction D2 as viewed from the tire width-direction D1 by 25% or more in the tire circumferential-direction D3 (preferably 50% or more, more preferably 75% or more).

An outer end 4a of the projecting portion 4 in the tire radial-direction D2 is located on an inner side in the tire radial-direction D2 than the tread surface 13a of the block 3. According to this, an uneven shape is formed by the tread surface 13a of the block 3 and the outer end 4a of the projecting portion 4 in the tire radial-direction D2.

Since the uneven shape exists, components of the surfaces and the edges are formed. The uneven shape is formed on the portion where the tire comes into contact with the ground such as mud, sand and rock, an area which comes into contact with the ground such as mud, sand and rock is increased, or the surface and the edge formed by the uneven shape easily come into contact with the ground such as mud, sand and rock at various positions. If the uneven shape is formed on the portion where the tire comes into contact with the ground such as mud, sand and rock, the traction performance is enhanced.

Each of the projecting portions 4 includes openings 6 and 7. According to this, a weight of the tire increases due to the existence of the projecting portion 4, and the openings 6 and 7 restrain the weight from increasing. This configuration restrains the weight balance from becoming non-uniform which may be caused by the existence of the projecting portion 4. Due to the existence of the openings 6 and 7, the components of the surfaces and edges are increased and thus, the traction performance is enhanced. The first and second openings 6 and 7 are formed into rectangular shape as viewed from the tire width-direction D1.

The openings 6 and 7 are separated from both end edges of the projecting portion 4 in the tire radial-direction D2. Further, the openings 6 and 7 are separated from the both end edges of the projecting portion 4 in the tire circumferential-direction D3. According to this, since the rigidity of the projecting portion 4 around the openings 6 and 7 can be enhanced, traction performance can be maintained by the projecting portion 4. For example, a width size between the opening edges of the openings 6 and 7 and the end edge of the projecting portion 4 is 1.5 mm or more (preferably, 2.0 mm or more).

The openings 6 and 7 are placed such that they include a center of the projecting portion 4 in the tire circumferential-direction D3. More specifically, central positions of the openings 6 and 7 in the tire circumferential-direction D3 match with the central position of the projecting portion 4 in the tire circumferential-direction D3. The openings 6 and 7 are line-symmetric with respect to center of the projecting portion 4 in the tire circumferential-direction D3. According to this, this configuration restrains the weight balance from becoming non-uniform in the tire circumferential-direction D3, and thus it is possible to restrain the uniformity when the tire is mounted on the vehicle from becoming deteriorated.

Each of the projecting portions 4 is divided into an inner region 4b which is placed on the inner side in the tire radial-direction D2 and an outer region 4c which is placed on the outer side in the tire radial-direction D2. In this embodiment, since the belt end position 12d is located at the same position as the annular protrusion portion 5, the inner region 4b is located on the inner side in the tire radial-direction D2 than the annular protrusion portion 5, and the outer region 4c is located on the outer side in the tire radial-direction D2 than the annular protrusion portion 5.

Each of the projecting portions 4 includes the two openings 6 and 7. More specifically, the projecting portion 4 includes the first opening 6 placed on the inner side in the tire radial-direction D2 and the second opening 7 placed on the outer side in the tire radial-direction D2. The first opening 6 is placed on the inner side in the tire radial-direction D2 than the annular protrusion portion 5, and the second opening 7 is placed on the outer side in the tire radial-direction D2 than the annular protrusion portion 5. That is, the first opening 6 is placed in the inner region 4b, and the second opening 7 is placed in the outer region 4c.

Figure 5:
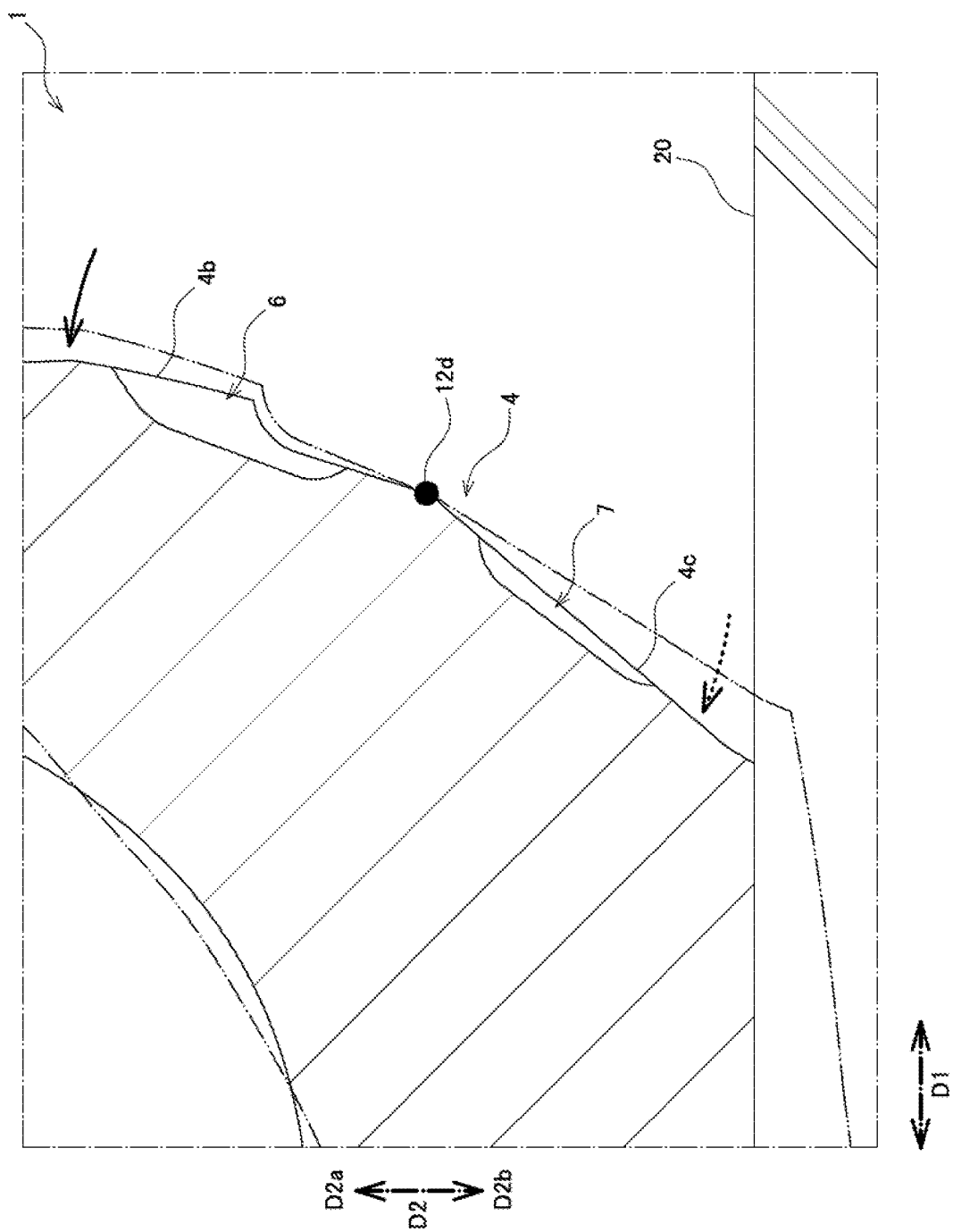
FIG. 5 is a sectional view of essential portions of the tire meridional plane of the pneumatic tire of the embodiment, and is a view showing a shape when the tire comes into contact with the ground.
Figure 6:
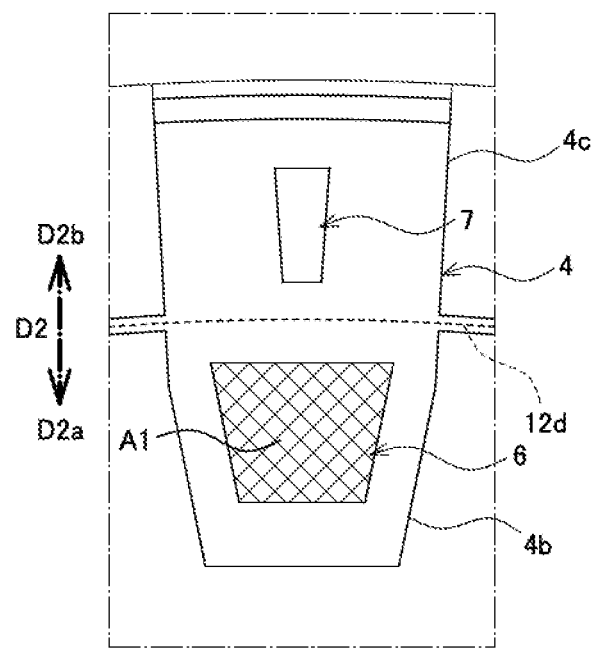
FIG. 6 is a diagram showing a region of an opening area of an opening in an inner region of the embodiment.
Figure 7:
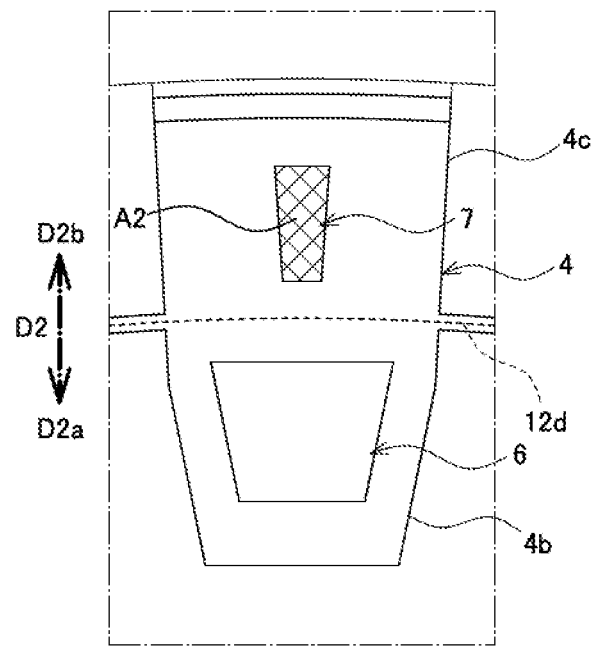
FIG. 7 is a diagram showing a region of an opening area of an opening in an outer region of the embodiment.
Figure 8:
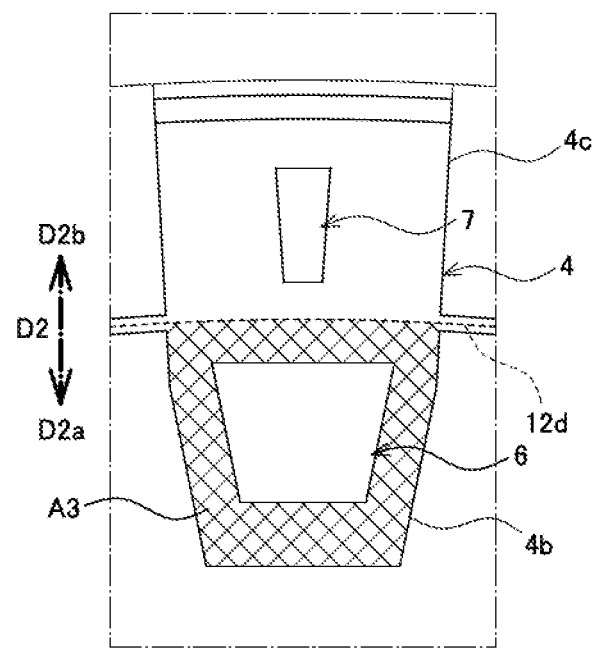
FIG. 8 is a diagram showing a region of an actual surface area of a projecting portion in the inner region of the embodiment.
Figure 9:
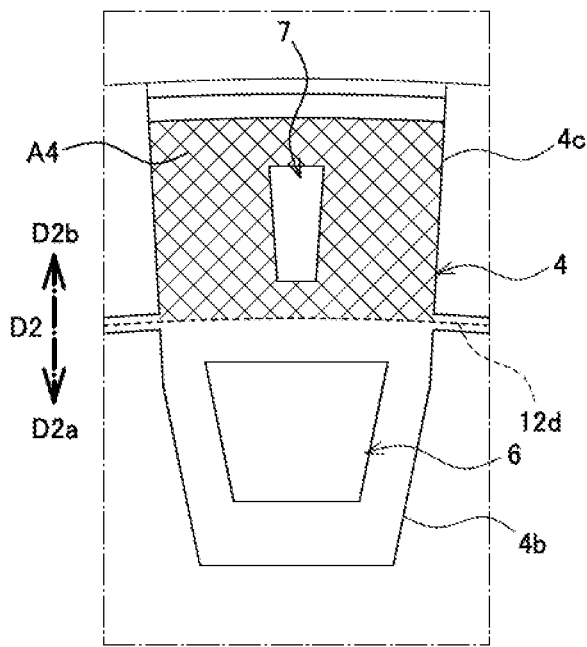
FIG. 9 is a diagram showing a region of an actual surface area of the projecting portion in the outer region of the embodiment.

As shown in FIG. 5, when a tire 1 mounted on a vehicle comes into contact with ground 20, the tire 1 becomes deformed by weight of the vehicle and the like. In FIG. 5, dashed-two dotted lines show shapes before the tire is deformed, and solid lines show shapes after deformation. At this time, the tire 1 generally becomes deformed differently from the belt end position 12d as a reference.

More specifically, the inner region 4b becomes deformed such that it is oriented to the sideway as shown by the solid lines, and the outer region 4c becomes deformed such that it is oriented to the ground 20 as shown by a broken arrow. Therefore, the first opening 6 of the inner region 4b acts advantageously for the traction when the tire 1 comes into contact with the ground such as rock standing from the surface of the ground 20.

Referring back to FIG. 4, a depth (maximum depth) of the first opening 6 in the inner region 4b is greater than a depth (maximum depth) of the second opening 7 in the outer region 4c. According to this, since a surface of the first opening 6 becomes large, friction between the first opening 6 and a rock becomes great. Therefore, it is possible to enhance the traction performance in the rocky area.

Further, a projecting amount (maximum projecting amount) of the projecting portion 4 in the inner region 4b becomes greater than a projecting amount (maximum projecting amount) of the projecting portion 4 in the outer region 4c. According to this, although the depth of the first opening 6 is deep, a rubber volume of the inner region 4b is secured. Therefore, it is possible to restrain the resistance to external damage of the inner region 4b from being deteriorated.

As shown in FIGS. 6 to 9, a ratio (A1/A3) of a total sum A1 of an opening area (meshed area in FIG. 6) of the first opening 6 to an actual area A3 (meshed area in FIG. 8) of the projecting portion 4 in the inner region 4b is greater than a ratio (A2/A4) of a total sum A2 of an opening area (meshed area in FIG. 7) of the second opening 7 to an actual area A4 (meshed area in FIG. 9) of the projecting portion 4 in the outer region 4c. According to this, since a rock easily comes into contact with a surface and an edge of the first opening 6, friction is more easily generated between the first opening 6 and the rock. Therefore, it is possible to enhance the traction performance in the rocky area.

As described above, the pneumatic tire 1 of the embodiment include a sidewall portion 12 extending in a tire radial-direction D2, and a tread portion 13 having a tread surface 13a on an outer side in the tire radial-direction D2 and connected to an outer end of the sidewall portion 12 in the tire radial-direction D2. The tread portion 13 includes a tread rubber 13b placed on the outer side in the tire radial-direction D2, and at least one belt ply 13d placed on an inner side of the tread rubber 13b in the tire radial-direction D2. The tread rubber 13b includes a plurality of grooves 2 extending to an outer end in a tire width-direction D1, and a plurality of blocks 3 arranged in a tire circumferential-direction D3 by being defined by the plurality of grooves 2. The sidewall portion 12 includes a plurality of projecting portions 4 projecting in the tire width-direction D1. The projecting portions 4 are placed such that at least portions of the projecting portions 4 are superposed on one of the plurality of blocks 3 in the tire radial-direction D2 as viewed from the tire width-direction D1. At least one of the plurality of projecting portions 4 includes at least one openings 6 and 7. At least one of the projecting 4 portions is divided into an inner region 4b placed on the inner side in the tire radial-direction D2 and an outer region 4c placed on the outer side in the tire radial-direction D2 with respect to a position of an outer end 13e of the belt play 13d in the tire width-direction D1, wherein the belt play 13d placed on the innermost side in the tire radial-direction D2. A depth of the opening 6 in the inner region 4b is greater than a depth of the opening 7 in the outer region 4c.

According to the above-described configuration, the projecting portion 4 is placed such that at least portion of the projecting portion 4 is superposed on at least one of the plurality of blocks 3 in the tire radial-direction D2 as viewed from the tire width-direction D1. Therefore, traction performance is exhibited by a positional relation (e.g., uneven shape) between the block 3 and the projecting portion 4 in the tire width-direction D1.

Due to the existence of the projecting portions 4, a rubber weight of this portion is increased. Hence, at least one of the plurality of projecting portions 4 includes the openings 6 and 7. According to this, it is possible to restrain the unevenness of the weight balance which may be caused by the existence of the projecting portions 4. Further, the traction performance is exhibited by the surfaces and the edges of the openings 6 and 7.

In the sidewall portions 12, generally, the inner region 4b located on the inner side in the tire radial-direction D2 becomes deformed such that the inner region 4b is oriented to sideway from the position, as a reference, of the outer end 13e of the tire width-direction D1 of the belt ply 13d placed on the innermost side in the tire radial-direction D2. Hence, a depth of the opening 6 in the inner region 4b is greater than the opening 7 in the outer region 4c.

According to this, since a surface of the opening 6 in the inner region 4b becomes large, a friction force between the opening 6 in the inner region 4b and rock becomes great. Therefore, it is possible to efficiently enhance traction performance in a rock area.

In the pneumatic tire 1 of the embodiment, in a ratio of the total sums A1 and A2 of the opening areas of the openings 6 and 7 with respect to an actual area A3 and A4 of the projecting portion 4, the ratio (A1/A3) of the inner region 4b is greater than the ratio (A2/A4) of the outer region 4c.

According to the above-described configuration, in the ratio of the total sums A1 and A2 of the opening areas of the openings 6 and 7 to the actual areas A3 and A4 of the projecting portion 4, the ratio (A1/A3) of the inner region 4b is greater than the ratio (A2/A4) of the outer region 4c. Therefore, rock easily comes into contact with the surface and the edge of the opening 6 in the inner region 4b. According to this, friction is more easily generated between the opening 6 of the inner region 4b and the rock. Hence, it is possible to further efficiently enhance the traction performance in the rocky area.

In the pneumatic tire 1 of the embodiment, a projecting amount of the projecting portion 4 in the inner region 4b is greater than a projecting amount of the projecting portion 4 in the outer region 4c.

According to the above-described configuration, the projecting amount of the projecting portion 4 in the inner region 4b becomes greater than a projecting amount of the projecting portion 4 in the outer region 4c. Therefore, it is possible to restrain the rubber volume of the inner region 4b from becoming small, for example. According to this, it is possible to restrain the resistance to external damage of the inner region 4b from being deteriorated, for example.

The pneumatic tire is not limited to the configuration of the first embodiment, and the pneumatic tire is not limited to the effect of the first embodiment. For example, the pneumatic tire of the first embodiment may be changed in the following manners.

Figure 10:
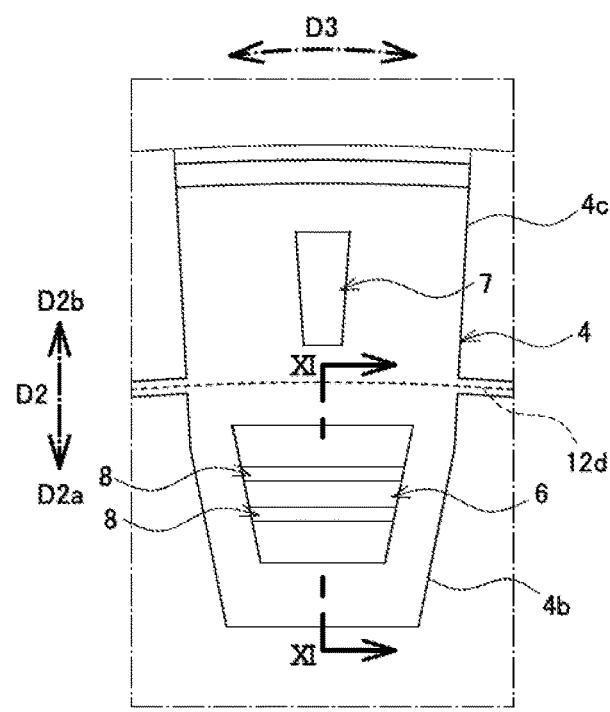
FIG. 10 is a diagram showing a projecting portion of a modification of the embodiment.
Figure 11:
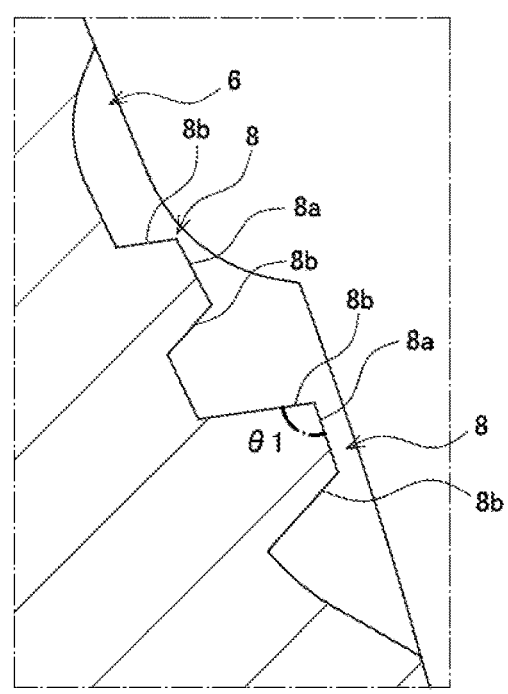
FIG. 11 is an enlarged sectional view of essential portions taken along line XI-XI of FIG. 10.

As shown in FIGS. 10 and 11, in the pneumatic tire 1, at least one of the projecting portions 4 may include a convex portion 8 which is accommodated in the opening 6 placed in the inner region 4b, and the convex portion 8 may extend along the tire circumferential-direction D3.

According to the above-described configuration, since at least one of the plurality of projecting portions 4 includes the convex portion 8 accommodated in the opening 6, traction performance is exhibited by a surface and an edge of the convex portion 8. Since the convex portion 8 extends along the tire circumferential-direction D3, when the convex portion 8 runs on rock, a friction force between the surface of the convex portion 8 and the rock becomes great. According to this, it is possible to enhance the traction performance in a rocky area.

The convex portion 8 may be formed such that its tip end becomes a flat surface shape. For example, a cross section of the convex portion 8 may be formed into a trapezoidal shape. According to the above-described configuration, since the tip end of the convex portion 8 is the flat surface shape, rigidity of the convex portion 8 becomes great. According to this, since the traction performance caused by the surface and the edge of the convex portion 8 can effectively be exhibited, it is possible to effectively enhance the traction performance. Further, since it is possible to restrain the convex portion 8 from being chipped, it is possible to restrain the resistance to external damage from being lowered.

A projecting amount of the convex portion 8 is smaller than a depth of the opening 6. The projecting amount of the convex portion 8 is ½ or more of the depth of the opening 6. The convex portion 8 includes a top surface 8a placed on its tip end, and a side surface 8b which forms a predetermined intersection angle θ1 between itself and the top surface 8a. It is preferable that the intersection angle θ1 is 105° or more and 130° or less. According to this, it is possible to secure the rigidity of the convex portion 8.

The convex portion 8 may be accommodated not only in the opening 6 placed in the inner region 4b but also in the opening 7 placed in the outer region 4c. It is possible to employ not only the configuration that the convex portion 8 extends along the tire circumferential-direction D3 but also a configuration that the convex portion 8 extends along the tire radial-direction D2.

In the pneumatic tire 1 of the first embodiment, in the ratio of the total sums A1 and A2 of the opening areas of the openings 6 and 7 to the actual areas A3 and A4 of the projecting portion 4, the ratio (A1/A3) of the inner region 4b is greater than the ratio (A2/A4) of the outer region 4c. However, the pneumatic tire is not limited to this configuration. For example, the ratio (A1/A3) of the inner region 4b may be smaller than the ratio (A2/A4) of the outer region 4c. Alternatively, the ratio (A1/A3) of the inner region 4b may be the same as the ratio (A2/A4) of the outer region 4c.

In the pneumatic tire 1 of the first embodiment, the projecting amount of the projecting portion 4 in the inner region 4b is greater than the projecting amount of the projecting portion 4 in the outer region 4c. However, the pneumatic tire is not limited to this configuration. For example, the projecting amount of the projecting portion 4 in the inner region 4b may be smaller than the projecting amount of the projecting portion 4 in the outer region 4c. Alternatively, the projecting amount of the projecting portion 4 in the inner region 4b may be the same as the projecting amount of the projecting portion 4 in the outer region 4c.

Second Embodiment

Next, a second embodiment in the pneumatic tire will be described with reference to FIGS. 12 to 21. In FIGS. 12 to 21, elements to which the same reference signs as those of FIGS. 1 to 11 are denoted have substantially the same configurations or functions (effects) as the first embodiment, and description thereof will not be repeated.

Figure 12:
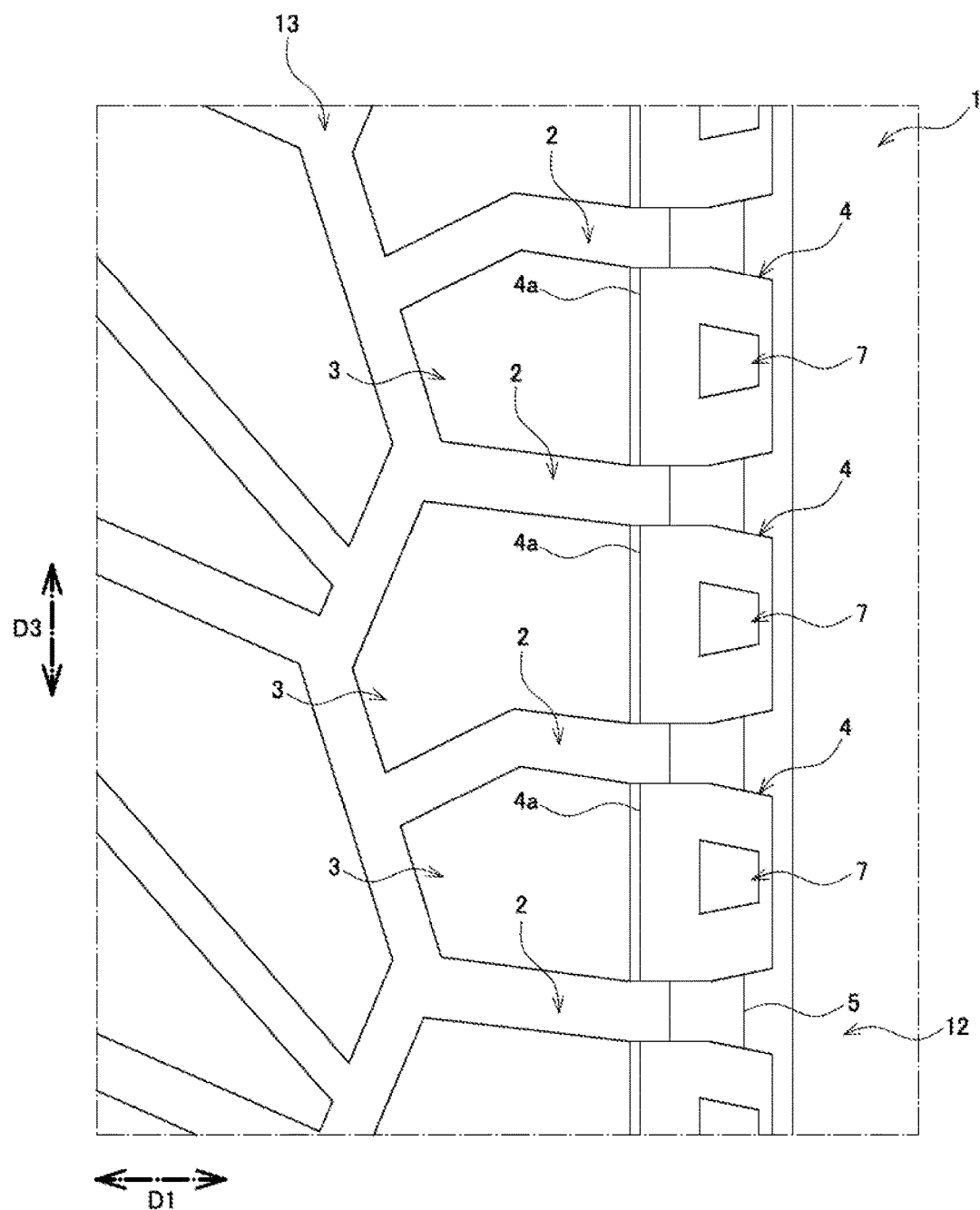
FIG. 12 is a front view (as viewed from tire radial-direction) of essential portions of a pneumatic tire of another embodiment.
Figure 13:
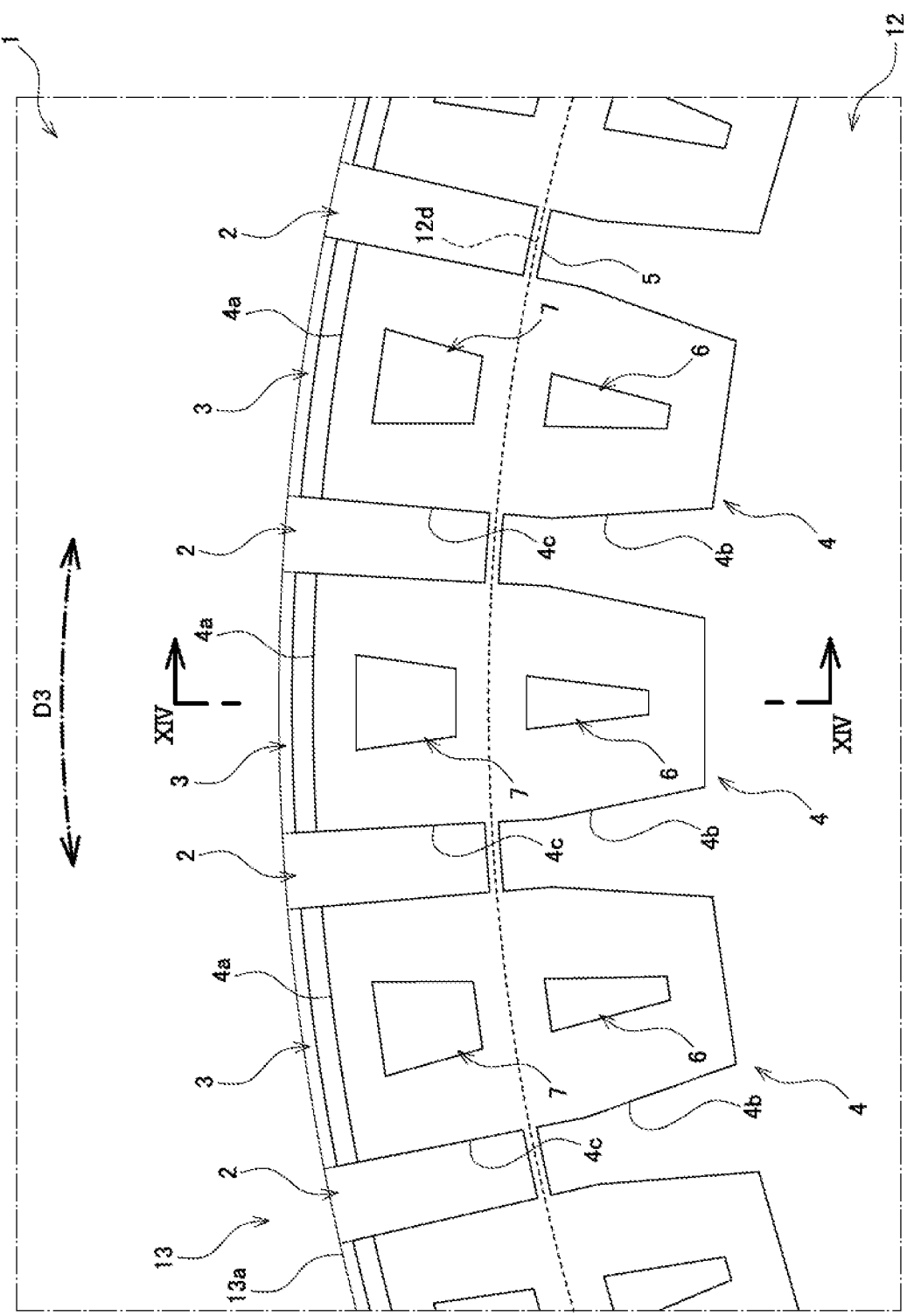
FIG. 13 is a side view (as viewed from tire width-direction) of essential portions of the pneumatic tire of the embodiment.
Figure 14:
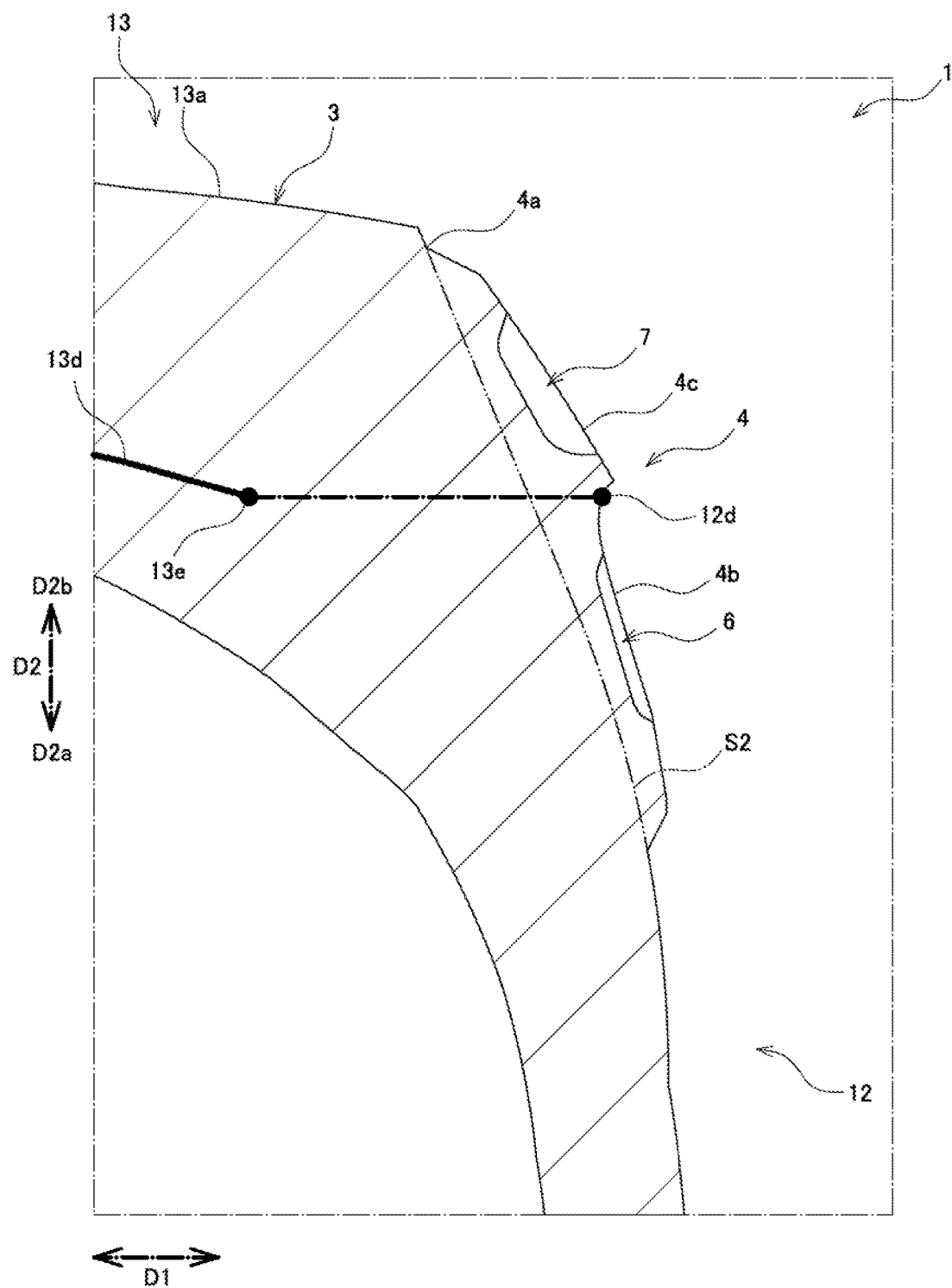
FIG. 14 is an enlarged sectional view of essential portions taken along line XIV-XIV of FIG. 13.

As shown in FIGS. 12 to 14, a tread portion 13 includes a plurality of grooves 2 and a plurality of blocks 3, each of sidewall portions 12 includes a plurality of projecting portions 4 and an annular protrusion portion 5, and each of the projecting portions 4 includes openings 6 and 7. Configuration of the projecting portions 4 and the openings 6 and 7 of this embodiment are different from those of the projecting portions 4 and the openings 6 and 7 of the first embodiment.

Figure 15:
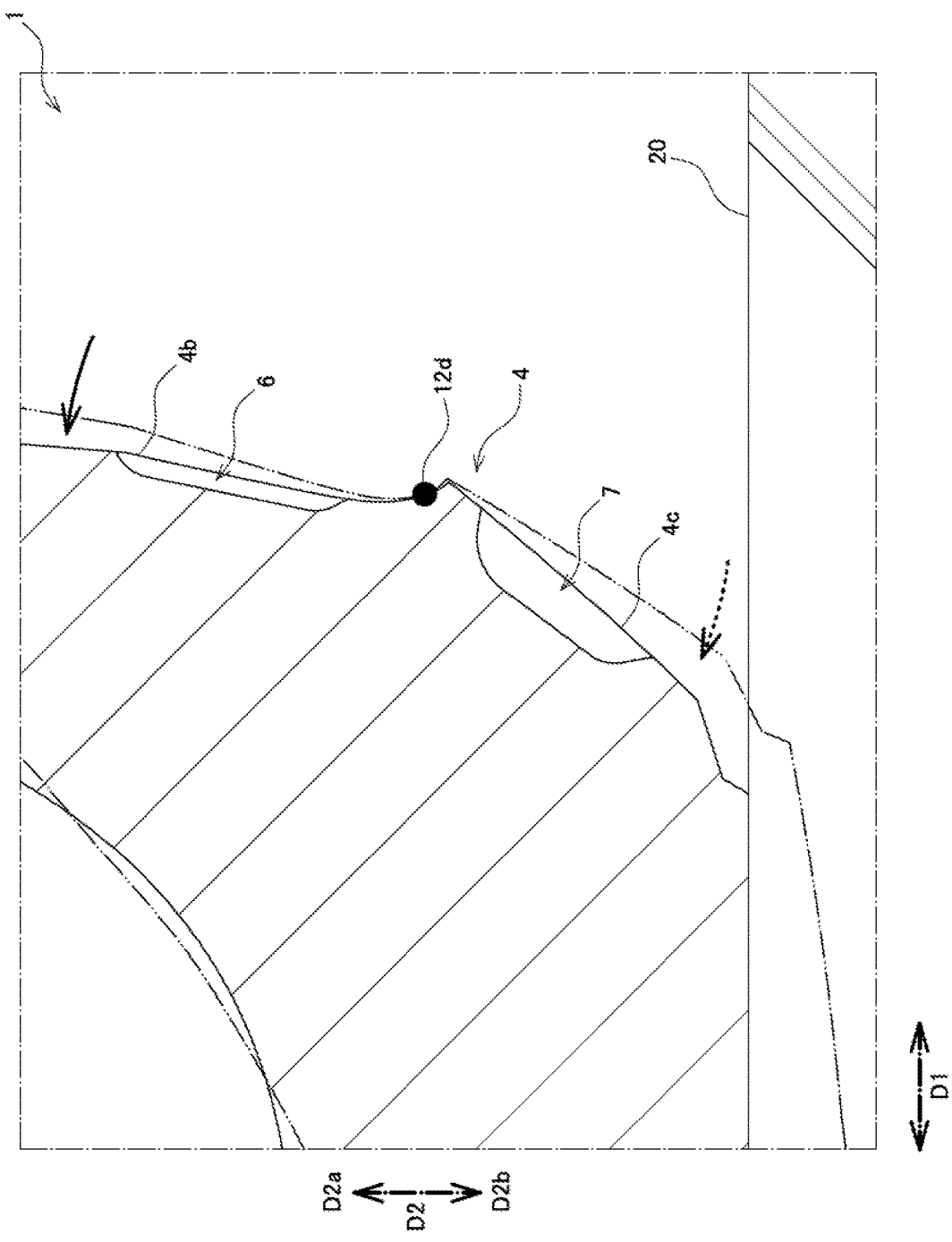
FIG. 15 is a sectional view of essential portions of the tire meridional plane of the pneumatic tire of the embodiment, and is a view showing a shape when the tire comes into contact with the ground.
Figure 16:
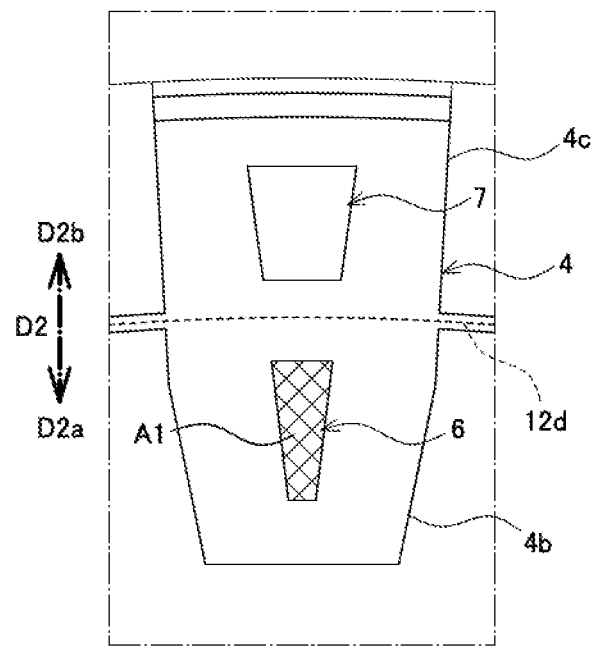
FIG. 16 is a diagram showing a region of an opening area of an opening in an inner region of the embodiment.
Figure 17:
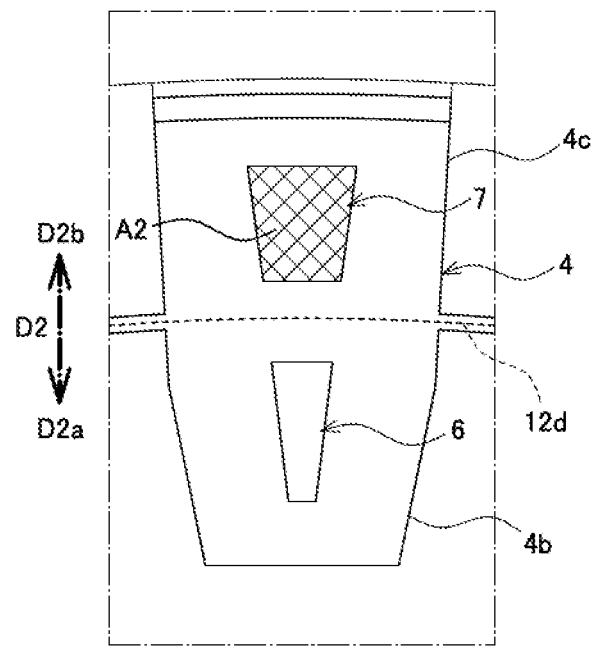
FIG. 17 is a diagram showing a region of an opening area of an opening in an outer region of the embodiment.
Figure 18:
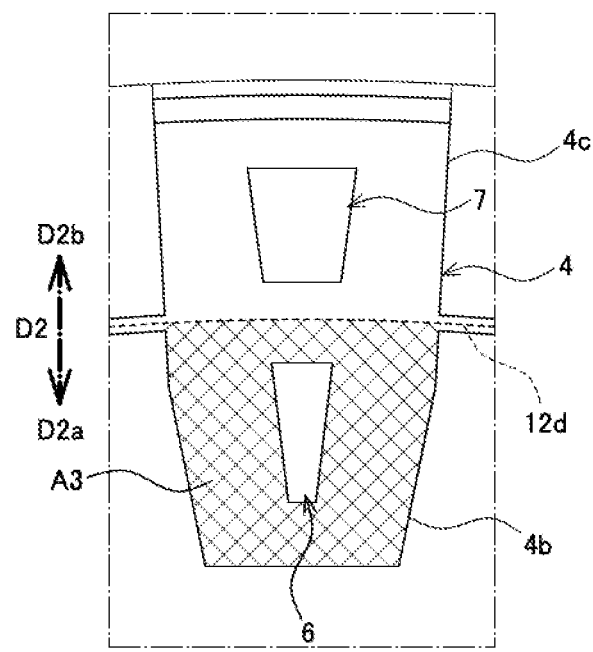
FIG. 18 is a diagram showing a region of an actual surface area of a projecting portion in the inner region of the embodiment.
Figure 19:
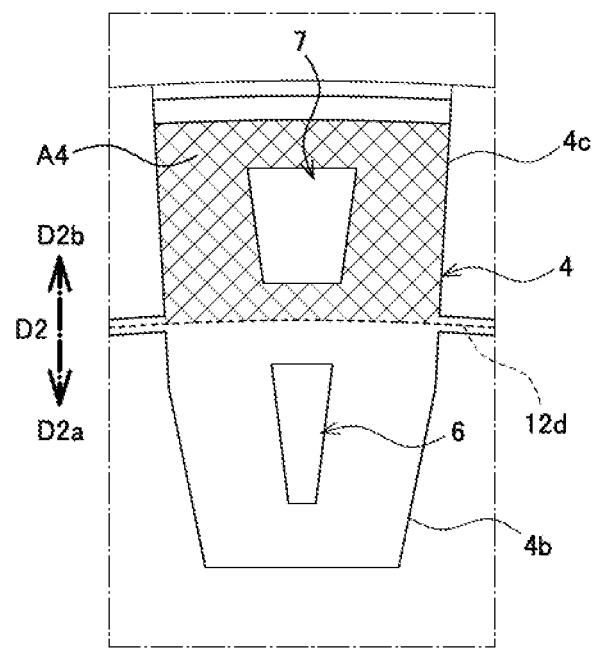
FIG. 19 is a diagram showing a region of an actual surface area of a projecting portion in the outer region of the embodiment.

As shown in FIG. 15, when the tire 1 mounted on the vehicle comes into contact with the ground 20, the tire 1 becomes deformed by the weight of the vehicle and the like. In FIG. 15, dashed-two dotted lines show shapes before the tire is deformed, and solid lines show shapes after deformation. At this time, the tire 1 generally becomes deformed differently from the belt end position 12*d* as a reference.

More specifically, the inner region 4*b* becomes deformed such that it is oriented to the sideway as shown by the solid lines, and the outer region 4*c* becomes deformed such that it is oriented to the ground 20 as shown by a broken arrow. Therefore, the second opening 7 in the outer region 4*c* acts advantageously for the traction when the tire 1 comes into contact with the ground such as mud accumulated on the surface of the ground 20.

Referring back to FIG. 14, a depth (maximum depth) of the second opening 7 in the outer region 4*c* is greater than a depth (maximum depth) of the first opening 6 in the inner region 4*b*. According to this, since a surface of the second opening 7 becomes large, resistance when the second opening 7 shears mud becomes great. Therefore, it is possible to enhance the traction performance in the mud area.

Further, a projecting amount (maximum projecting amount) of the projecting portion 4 in the outer region 4*c* becomes greater than a projecting amount (maximum projecting amount) of the projecting portion 4 in the inner region 4*b*. According to this, although the opening area of the second opening 7 is great and the depth of the second opening 7 is deep, a rubber volume of the outer region 4*c* is secured. Therefore, it is possible to restrain the resistance to external damage of the outer region 4*c* from being deteriorated.

As shown in FIGS. 16 to 19, a ratio (A2/A4) of the total sum A2 of the opening area (meshed region in FIG. 17) of the second opening 7 to an actual area A4 (meshed region in FIG. 19) of the projecting portion 4 in the outer region 4*c* is greater than a ratio (A1/A3) of the total sum A1 of an opening area (meshed region in FIG. 16) of the first opening 6 to an actual area A3 (meshed region in FIG. 18) of the projecting portion 4 in the inner region 4*b*. According to this, since mud easily enters the second opening 7, mud in the second opening 7 is easily sheared. Therefore, if is possible to enhance the traction performance in the mud area.

As described above, the pneumatic tire 1 of the embodiment include a sidewall portion 12 extending in a tire radial-direction D2, and a tread portion 13 having a tread surface 13*a* on an outer side in the tire radial-direction D2 and connected to an outer end of the sidewall portion 12 in the tire radial-direction D2. The tread portion 13 includes a tread rubber 13*b* placed on the outer side in the tire radial-direction D2, and at least one belt ply 13*d* placed on an inner side of the tread rubber 13*b* in the tire radial-direction D2. The tread rubber 13*b* includes a plurality of grooves 2 extending to an outer end in a tire width-direction D1, and a plurality of blocks 3 arranged in a tire circumferential-direction D3 by being defined by the plurality of grooves 2. The sidewall portion 12 includes a plurality of projecting portions 4 projecting in the tire width-direction D1. The projecting portions 4 are placed such that at least portions of the projecting portions 4 are superposed on one of the plurality of blocks 3 in the tire radial-direction D2 as viewed from the tire width-direction D1. At least one of the plurality of projecting portions 4 includes at least one openings 6 and 7. At least one of the projecting 4 portions is divided into an inner region 4*b* placed on the inner side in the tire radial-direction D2 and an outer region 4*c* placed on the outer side in the tire radial-direction D2 with respect to a position of an outer end 13*e* of the belt play 13*d* in the tire width-direction D1, wherein the belt play 13*d* placed on the innermost side in the tire radial-direction D2. A depth of the opening 7 in the outer region 4*c* is greater than a depth of the opening 6 in the inner region 4*b*.

According to the above-described configuration, the projecting portion 4 is placed such that at least portion of the projecting portion 4 is superposed on at least one of the plurality of blocks 3 in the tire radial-direction D2 as viewed from the tire width-direction D1. Therefore, traction performance is exhibited by a positional relation (e.g., uneven shape) between the block 3 and the projecting portion 4 in the tire width-direction D1.

Due to the existence of the projecting portions 4, a rubber weight of this portion is increased. Hence, at least one of the plurality of projecting portions 4 includes the openings 6 and 7. According to this, it is possible to restrain the unevenness of the weight balance which may be caused by the existence of the projecting portions 4. Further, the traction performance is exhibited by the surfaces and the edges of the openings 6 and 7.

In the sidewall portions 12, generally, the outer region 4*c* located on the outer side in the tire radial-direction D2 becomes deformed such that the outer region 4*c* is oriented to the ground 20 from the position, as a reference, of the outer end 13*e* of the tire width-direction D1 of the belt ply 13*d* placed on the innermost side in the tire radial-direction D2. Hence, the depth of the opening 7 in the outer region 4*c* is greater than the opening 6 in the inner region 4*b*.

According to this, since the surface of the opening 7 of the outer region 4*c* becomes large, resistance when the opening 7 of the outer region 4*c* shears mud becomes large. Therefore, it is possible to more effectively enhance the traction performance in the mud area.

In the pneumatic tire 1 of the embodiment, in a ratio of the total sums A1 and A2 of the opening areas of the openings 6 and 7 with respect to an actual areas A3 and A4 of the projecting portion 4, the ratio (A2/A4) of the outer region 4*c* is greater than the ratio (A1/A3) of the inner region 4*b*.

According to the above-described configuration, in the ratio of the total sums A1 and A2 of the opening areas of the openings 6 and 7 to the actual areas A3 and A4 of the projecting portion 4, the ratio (A2/A4) of the outer region 4*c* is greater than the ratio (A1/A3) of the inner region 4*b*. Therefore, mud easily enters the opening 7 of the outer region 4*c*. According to this, since shear of mud in the opening 7 in the outer region 4*c* is more easily generated, it is possible to further efficiently enhance the traction performance in the mud area.

In the pneumatic tire 1 of the embodiment, a projecting amount of the projecting portion 4 in the outer region 4*c* is greater than a projecting amount of the projecting portion 4 in the inner region 4*b*.

According to the above-described configuration, since the projecting amount of the projecting portion 4 in the outer region 4*c* becomes greater than the projecting amount of the projecting portion 4 in the inner region 4*b*, it is possible to restrain the rubber volume of the outer region 4*c* from becoming small. According to this, it is possible to restrain the resistance to external damage of the outer region 4*c* from being deteriorated.

The pneumatic tire is not limited to the configuration of the second embodiment, and the pneumatic tire is not limited to the effect of the second embodiment. For example, the pneumatic tire of the second embodiment may be changed in the following manners.

Figure 20:
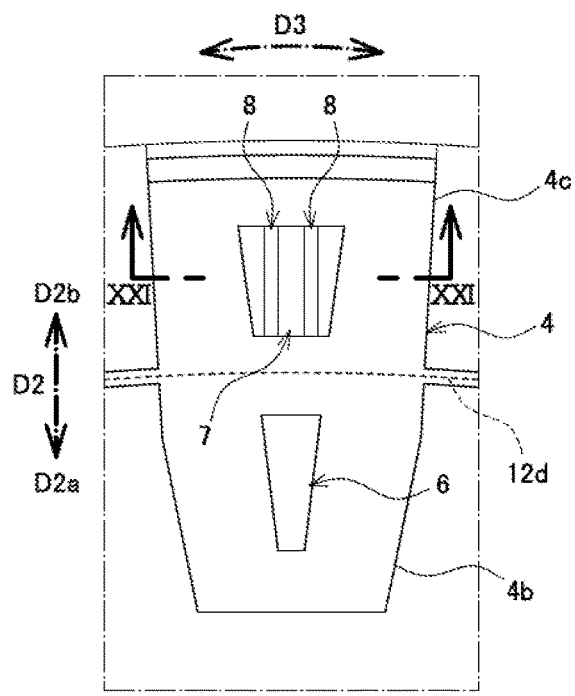
FIG. 20 is a diagram showing projecting portions of a modification of the embodiment.
Figure 21:
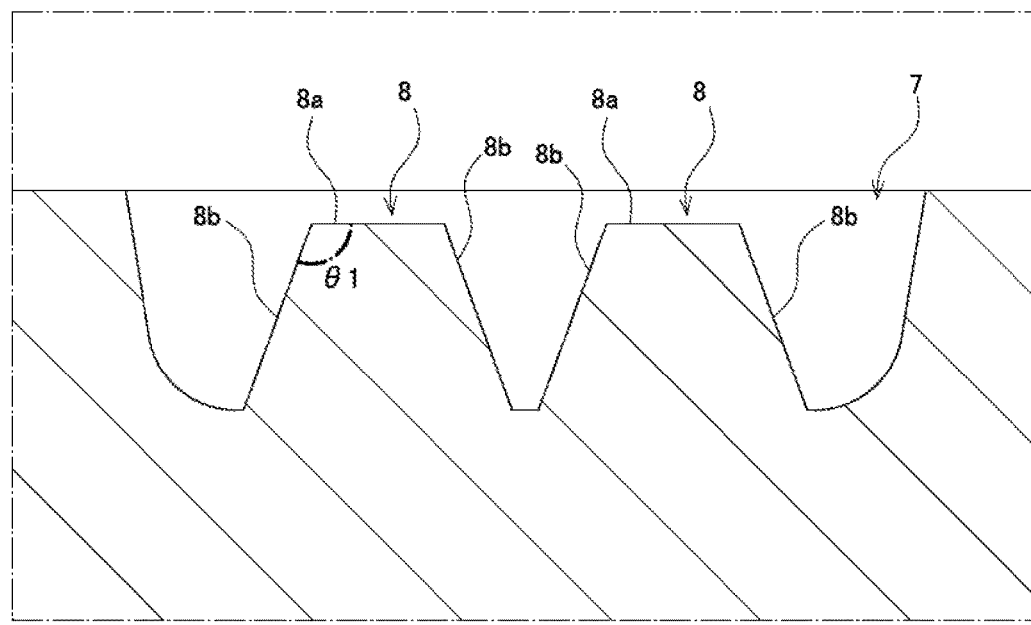
FIG. 21 is an enlarged sectional view of essential portions taken along line XXI-XXI of FIG. 20.

As shown in FIGS. 20 and 21, in the pneumatic tire 1, at least one of the projecting portions 4 may include a convex portion 8 which is accommodated in the opening 7 placed in the outer region 4c, and the convex portion 8 may extend along the tire radial-direction D2.

According to the above-described configuration, since at least one of the plurality of projecting portions 4 includes the convex portion 8 accommodated in the opening 7, traction performance is exhibited by a surface and an edge of the convex portion 8. Since the convex portions 8 extend along the tire radial-direction D2, resistance when the surface of the convex portion 8 shears becomes great when the convex portions 8 are soaked in mud. According to this, traction performance can be enhanced in a mud area.

The convex portion 8 may be formed such that its tip end becomes a flat surface shape. For example, a cross section of the convex portion 8 may be formed into a trapezoidal shape. According to the above-described configuration, since the tip end of the convex portion 8 is the flat surface shape, rigidity of the convex portion 8 becomes great. According to this, since the traction performance caused by the surface and the edge of the convex portion 8 can effectively be exhibited, it is possible to effectively enhance the traction performance. Further, since it is possible to restrain the convex portion 8 from being chipped, it is possible to restrain the resistance to external damage from being lowered.

A projecting amount of the convex portion 8 is smaller than a depth of the opening 7. The projecting amount of the convex portion 8 is ½ or more of the depth of the opening 7. The convex portion 8 includes a top surface 8a placed on its tip end, and a side surface 8b which forms a predetermined intersection angle $\theta 1$ between itself and the top surface 8a. It is preferable that the intersection angle $\theta 1$ is 105° or more and 130° or less. According to this, it is possible to secure the rigidity of the convex portion 8.

The convex portion 8 may be accommodated not only in the opening 7 placed in the outer region 4c but also in the opening 6 placed in the inner region 4b. It is possible to employ not only the configuration that the convex portion 8 extends along the tire radial-direction D2 but also a configuration that the convex portion 8 extends along the tire circumferential-direction D3.

In the pneumatic tire 1 of the second embodiment, in the ratio of the total sums A1 and A2 of the openings 6 and 7 to the actual areas A3 and A4 of the projecting portion 4, the ratio (A2/A4) of the outer region 4c is greater than the ratio (A1/A3) of the inner region 4b. However, the pneumatic tire is not limited to this configuration. For example, the ratio (A2/A4) of the outer region 4c may be smaller than the ratio (A1/A3) of the inner region 4b. Alternatively, the ratio (A2/A4) of the outer region 4c may be the same as the ratio (A1/A3) of the inner region 4b.

In the pneumatic tire 1 of the second embodiment, the projecting amount of the projecting portion 4 in the outer region 4c is greater than the projecting amount of the projecting portion 4 in the inner region 4b. However, the pneumatic tire is not limited to this configuration. For example, the projecting amount of the projecting portion 4 in the outer region 4c may be smaller than the projecting amount of the projecting portion 4 in the inner region 4b. Alternatively, the projecting amount of the projecting portion 4 in the outer region 4c may be the same as the projecting amount of the projecting portion 4 in the inner region 4b.

Note that, the pneumatic tire is not limited to the configurations of the above-described embodiment, and is not limited to the above-described working effects. The pneumatic tire can of course be variously modified within a scope not departing from the subject matters of the present invention. For example, the configurations and methods of the above-described plurality of embodiments may arbitrarily be employed and combined (configuration or method of one of embodiments may be applied to configuration or method of other embodiment), and it is possible to arbitrarily select one or more of configurations and methods of the later-described various modifications, and such configurations and methods may be employed for the configurations or the methods of the above-described embodiments.

In the pneumatic tire 1 of the embodiments, two openings 6 and 7 are provided in one projecting portion 4. However, the pneumatic tire is not limited to this configuration. For example, one or three or more openings may be provided in one projecting portion 4.

In the pneumatic tire 1 of the embodiments, the openings 6 and 7 are formed into rectangular shapes as viewed from the tire width-direction D1. However, the pneumatic tire is not limited to this configuration. For example, the openings may be formed into a circular (perfect circular, elliptic) shape as viewed from the tire width-direction D1. Further, for example, the openings may be formed into a triangular shape or a polygonal shape having five angle portions or more as viewed from the tire width-direction D1.

In the pneumatic tire 1 of the embodiments, the openings 6 and 7 are provided in all of the projecting portions 4. However, the pneumatic tire is not limited to this configuration. For example, it is only necessary that the openings 6 and 7 are provided at least in one of the plurality of projecting portions 4. It is preferable that the openings 6 and 7 are provided at least in ¼ of the plurality of projecting portions 4, it is more preferable that the openings 6 and 7 are provided at least in ⅓, and it is more preferable that the openings 6 and 7 are provided at least in ½.

In the pneumatic tire 1 of the embodiments, all of the projecting portions 4 have the same shapes, and all of the openings 6 and 7 have the same shape. However, the pneumatic tire is not limited to this configuration. The projecting portions 4 may have different shapes, and they may be placed in series in the tire circumferential-direction D3. Further, the openings 6 and 7 may have a plurality of different shapes, and may be placed in the respective projecting portions 4 in series in the tire circumferential-direction D3.

In the pneumatic tire 1 of the embodiments, the openings 6 and 7 are respectively separated from both end edges of the projecting portion 4 in the tire radial-direction D2. However, the pneumatic tire is not limited to this configuration. The openings 6 and 7 may be separated only from one of the end edges of the projecting portion 4 in the tire radial-direction D2.

In the pneumatic tire 1 of the embodiments, the openings 6 and 7 are respectively separated from both end edges of the projecting portion 4 in the tire circumferential-direction D3. However, the pneumatic tire is not limited to this configuration. The openings 6 and 7 may be separated only from one of the end edges of the projecting portion 4 in the tire circumferential-direction D3.

In the pneumatic tire 1 of the embodiments, the projecting portions 4 are provided on both of the pair of sidewall portions 12. However, the pneumatic tire is not limited to this configuration. For example, the projecting portions 4 may be provided on one of the pair of sidewall portions 12. For example, the projecting portions 4 may be provided on at least one of the pair of sidewall portions 12 which is placed on the outer side when the tire is mounted on the vehicle.

The pneumatic tire 1 may employ such as configuration that the projecting portions 4 are provided on both of the pair of sidewall portions 12 but the openings 6 and 7 are provided on one of or both of the sidewall portions 12. For example, the openings 6 and 7 may be provided on one of the pair of sidewall portions 12 which is placed on the outer side when the tire is mounted on the vehicle.

What is claimed is:

1. A pneumatic tire comprising:
    a sidewall portion extending in a tire radial-direction; and
    a tread portion having a tread surface on an outer side in the tire radial-direction and connected to an outer end of the sidewall portion in the tire radial-direction, wherein
    the tread portion includes a tread rubber placed on the outer side in the tire radial-direction, and at least one belt ply placed on an inner side of the tread rubber in the tire radial-direction,
    the tread rubber includes a plurality of grooves extending to an outer end of the tread portion in a tire width-direction, and a plurality of blocks arranged in a tire circumferential-direction by being defined by the plurality of grooves,
    the sidewall portion includes a plurality of projecting portions projecting in the tire width-direction,
    the projecting portions are placed such that at least portions of the projecting portions are superposed on one of the plurality of blocks in the tire radial-direction as viewed from the tire width-direction,
    at least one of the projecting portions is divided into an inner region placed on the inner side in the tire radial-direction and an outer region placed on the outer side in the tire radial-direction with respect to a position of an outer end of the belt ply in the tire width-direction, wherein the belt ply placed on an innermost side in the tire radial-direction,
    at least one of the plurality of projecting portions includes a first opening in the inner region and a second opening in the outer region,
    a depth of the first opening is greater than a depth of the second opening region, and
    the inner region becomes narrower in a width in the tire circumferential-direction as the inner region proceeds inwardly in the tire radial-direction.

2. The pneumatic tire according to claim 1, wherein in a ratio of the total sums of opening areas of the first and second openings with respect to an actual area of the at least one of the plurality of projecting portions, the ratio of the opening area of the first opening is greater than the ratio of the opening area of the second opening.

3. The pneumatic tire according to claim 1, wherein a projecting amount of the projecting portion in the inner region is greater than a projecting amount of the projecting portion in the outer region.

4. The pneumatic tire according to claim 1, wherein at least one of the projecting portions includes a convex portion accommodated in the opening placed in the inner region, and
    the convex portion extends along the tire circumferential-direction.

5. The pneumatic tire according to claim 4, wherein a projecting amount of the convex portion is equal to more than ½ of the depth of the opening.

6. The pneumatic tire according to claim 1, wherein a gap between two neighboring projecting portions, out of the plurality of projecting portions, in the tire circumferential-direction becomes bigger as the gap proceeds inwardly in the tire radial-direction.

7. The pneumatic tire according to claim 1, wherein the sidewall portion includes only one annular protrusion portion between two neighboring projecting portions, out of the plurality of projecting portions, and the annular protrusion portion is connected to the two neighboring projecting portions at locations remote from inner end portions of the two neighboring projecting portions in the tire radial-direction.

8. The pneumatic tire according to claim 1, wherein a gap between two neighboring projecting portions, out of the plurality of projecting portions, in the tire circumferential-direction becomes bigger as the gap proceeds inwardly in the tire radial-direction, the sidewall portion includes only one annular protrusion portion between two neighboring projecting portions, out of the plurality of projecting portions, and the annular protrusion portion is connected to the two neighboring projecting portions at locations remote from inner end portions of the two neighboring projecting portions in the tire radial-direction.

9. The pneumatic tire according to claim 8, wherein each of the first and second openings becomes narrower in a width in the tire circumferential-direction as each of the first and second openings proceeds inwardly in the tire radial-direction.

10. The pneumatic tire according to claim 8, wherein in a ratio of the total sums of opening areas of the first and second openings with respect to an actual area of the at least one of the plurality of projecting portions, the ratio of the opening area of the first opening is smaller than the ratio of the opening area of the second opening.

11. The pneumatic tire according to claim 1, wherein each of the first and second openings becomes narrower in a width in the tire circumferential-direction as each of the first and second openings proceeds inwardly in the tire radial-direction.

12. The pneumatic tire according to claim 1, wherein in a ratio of the total sums of opening areas of the first and second openings with respect to an actual area of the at least one of the plurality of projecting portions, the ratio of the opening area of the first opening is smaller than the ratio of the opening area of the second opening.

13. A pneumatic tire comprising:
    a sidewall portion extending in a tire radial-direction; and
    a tread portion having a tread surface on an outer side in the tire radial-direction and connected to an outer end of the sidewall portion in the tire radial-direction, wherein
    the tread portion includes a tread rubber placed on the outer side in the tire radial-direction, and at least one belt ply placed on an inner side of the tread rubber in the tire radial-direction,
    the tread rubber includes a plurality of grooves extending to an outer end of the tread portion in a tire width-direction, and a plurality of blocks arranged in a tire circumferential-direction by being defined by the plurality of grooves,
    the sidewall portion includes a plurality of projecting portions projecting in the tire width-direction, the projecting portions are placed such that at least portions of the projecting portions are superposed on one of the plurality of blocks in the tire radial-direction as viewed from the tire width-direction, at least one of the projecting portions is divided into an inner region placed on the inner side in the tire radial-direction and an outer region placed on the outer side in the tire radial-direction with respect to a position of an outer end of the belt ply in the tire width-direction, wherein the belt ply placed on an innermost side in the tire radial-direction, at least one of the plurality of projecting portions includes a first opening in the inner region and a second opening in the outer region, a depth of the first opening is greater than a depth of the second opening, and a gap between two neighboring projecting portions, out of the plurality of projecting portions, in the tire circumferential-direction becomes bigger as the gap proceeds inwardly in the tire radial-direction.

14. The pneumatic tire according to claim 13, wherein the sidewall portion includes only one annular protrusion portion between two neighboring projecting portions, out of the plurality of projecting portions, and the annular protrusion portion is connected to the two neighboring projecting portions at locations remote from inner end portions of the two neighboring projecting portions in the tire radial-direction.

15. The pneumatic tire according to claim 13, wherein each of the first and second openings becomes narrower in a width in the tire circumferential-direction as each of the first and second openings proceeds inwardly in the tire radial-direction.

16. The pneumatic tire according to claim 13, wherein in a ratio of the total sums of opening areas of the first and second openings with respect to an actual area of the at least one of the plurality of projecting portions, the ratio of the opening area of the first opening is smaller than the ratio of the opening area of the second opening.

17. A pneumatic tire comprising:
a sidewall portion extending in a tire radial-direction; and
a tread portion having a tread surface on an outer side in the tire radial-direction and connected to an outer end of the sidewall portion in the tire radial-direction, wherein the tread portion includes a tread rubber placed on the outer side in the tire radial-direction, and at least one belt ply placed on an inner side of the tread rubber in the tire radial-direction, the tread rubber includes a plurality of grooves extending to an outer end of the tread portion in a tire width-direction, and a plurality of blocks arranged in a tire circumferential-direction by being defined by the plurality of grooves, the sidewall portion includes a plurality of projecting portions projecting in the tire width-direction, the projecting portions are placed such that at least portions of the projecting portions are superposed on one of the plurality of blocks in the tire radial-direction as viewed from the tire width-direction, at least one of the projecting portions is divided into an inner region placed on the inner side in the tire radial-direction and an outer region placed on the outer side in the tire radial-direction with respect to a position of an outer end of the belt ply in the tire width-direction, wherein the belt ply placed on an innermost side in the tire radial-direction, at least one of the plurality of projecting portions includes a first opening in the inner region and a second opening in the outer region, a depth of the first opening is greater than a depth of the second opening, and the sidewall portion includes only one annular protrusion portion between two neighboring projecting portions, out of the plurality of projecting portions, and the annular protrusion portion is connected to the two neighboring projecting portions at locations remote from inner end portions of the two neighboring projecting portions in the tire radial-direction.

18. The pneumatic tire according to claim 17, wherein each of the first and second openings becomes narrower in a width in the tire circumferential-direction as each of the first and second openings proceeds inwardly in the tire radial-direction.

19. The pneumatic tire according to claim 17, wherein in a ratio of the total sums of opening areas of the first and second openings with respect to an actual area of the at least one of the plurality of projecting portions, the ratio of the opening area of the first opening is smaller than the ratio of the opening area of the second opening.

* * * * *